United States Patent
Lee

(10) Patent No.: US 10,248,304 B2
(45) Date of Patent: Apr. 2, 2019

(54) METHOD FOR DISPLAYING MONITORING SCREEN AT A DISPLAY LOCATION

(71) Applicant: LSIS CO., LTD., Gyeonggi-do (KR)

(72) Inventor: Seung-Ju Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 62 days.

(21) Appl. No.: 15/588,342

(22) Filed: May 5, 2017

(65) Prior Publication Data

US 2018/0150198 A1    May 31, 2018

(30) Foreign Application Priority Data

Nov. 30, 2016   (KR) .................. 10-2016-0161155

(51) Int. Cl.
| | | |
|---|---|---|
| *G06F 3/0486* | (2013.01) | |
| *G06F 3/0482* | (2013.01) | |
| *G06F 3/14* | (2006.01) | |
| *G05B 23/02* | (2006.01) | |
| *G06F 3/0488* | (2013.01) | |
| *G09G 5/14* | (2006.01) | |

(52) U.S. Cl.
CPC ....... *G06F 3/0486* (2013.01); *G05B 23/0267* (2013.01); *G06F 3/0482* (2013.01); *G06F 3/04886* (2013.01); *G06F 3/1454* (2013.01); G05B 2219/32404 (2013.01); G09G 5/14 (2013.01)

(58) Field of Classification Search
CPC .................. G06F 3/0486; G06F 3/04886
See application file for complete search history.

(56) References Cited

U.S. PATENT DOCUMENTS

| | | | | | |
|---|---|---|---|---|---|
| 5,060,170 | A | * | 10/1991 | Bourgeois | G09G 5/14 715/788 |
| 5,121,478 | A | * | 6/1992 | Rao | G06F 9/451 715/804 |
| 5,371,847 | A | * | 12/1994 | Hargrove | G06F 3/0481 715/788 |
| 5,377,317 | A | * | 12/1994 | Bates | G06F 3/0481 714/E11.188 |
| 5,390,295 | A | * | 2/1995 | Bates | G06F 3/0481 714/E11.188 |

(Continued)

FOREIGN PATENT DOCUMENTS

| | | |
|---|---|---|
| JP | 3462842 B2 | 11/2003 |
| JP | 1020060074496 | 7/2006 |

(Continued)

OTHER PUBLICATIONS

European search report dated Sep. 8, 2017 for corresponding EP application 17168425.1.

(Continued)

*Primary Examiner* — Reza Nabi
(74) *Attorney, Agent, or Firm* — K&L Gates LLP

(57) ABSTRACT

The method for displaying a monitoring screen for a control program includes: providing a list of files of monitoring screens via a display unit; receiving a file of a monitoring screen to be displayed among the files of the list and a display location of the monitoring screen from a user; and executing the file of the monitoring screen input from the user to display the monitoring screen at the display location.

7 Claims, 8 Drawing Sheets

(56) References Cited

U.S. PATENT DOCUMENTS

| | | | | |
|---|---|---|---|---|
| 5,499,334 A * | 3/1996 | Staab | G06F 3/0481 | 715/778 |
| 5,577,187 A * | 11/1996 | Mariani | G06F 3/0481 | 715/792 |
| 5,657,463 A * | 8/1997 | Bingham | G09G 5/14 | 715/799 |
| 5,734,915 A * | 3/1998 | Roewer | G06F 3/04845 | 715/202 |
| 5,796,402 A * | 8/1998 | Ellison-Taylor | G09G 5/14 | 715/792 |
| 6,762,853 B1 * | 7/2004 | Takagi | H04N 1/00204 | 358/1.1 |
| 6,763,497 B1 * | 7/2004 | Softky | G06F 11/3664 | 714/E11.217 |
| 7,013,289 B2 * | 3/2006 | Horn | G06Q 10/087 | 705/14.51 |
| 7,082,380 B2 * | 7/2006 | Wiebe | F25B 49/005 | 702/182 |
| 7,274,382 B2 * | 9/2007 | Plut | G06F 9/451 | 345/660 |
| 7,346,855 B2 * | 3/2008 | Hellyar | G06F 3/0235 | 715/780 |
| 7,546,602 B2 * | 6/2009 | Hejlsberg | G06F 9/54 | 717/114 |
| 7,928,994 B2 * | 4/2011 | Plut | G06F 3/0481 | 345/619 |
| 8,001,479 B2 * | 8/2011 | Katsuranis | G06F 9/451 | 715/763 |
| 8,121,741 B2 * | 2/2012 | Taft | G01D 4/004 | 700/295 |
| 8,239,055 B2 * | 8/2012 | Grove | G05B 15/02 | 700/104 |
| 8,434,019 B2 * | 4/2013 | Nelson | G06F 3/0481 | 715/798 |
| 8,468,462 B2 * | 6/2013 | Adams | G06F 9/451 | 715/778 |
| 8,555,193 B2 * | 10/2013 | Sar | G06F 9/451 | 715/781 |
| 8,560,949 B2 * | 10/2013 | Rissanen | G05B 23/0272 | 715/711 |
| 8,627,225 B2 * | 1/2014 | Adams | G06F 9/451 | 715/781 |
| 8,681,146 B2 * | 3/2014 | Bell | G06T 15/40 | 345/419 |
| 8,683,380 B2 * | 3/2014 | Plow | G06F 17/2211 | 715/804 |
| 8,970,600 B2 * | 3/2015 | Rissanen | G05B 23/0267 | 345/441 |
| 8,977,372 B2 * | 3/2015 | Ojha | G05B 19/41865 | 370/230 |
| 9,020,614 B2 * | 4/2015 | Fujieda | G05B 19/042 | 700/83 |
| 9,037,997 B2 * | 5/2015 | Ording | G06F 3/0481 | 715/790 |
| 9,240,164 B2 * | 1/2016 | Cupitt | G09G 5/14 | |
| 9,497,092 B2 * | 11/2016 | Gomez | H04W 64/00 | |
| 9,542,081 B2 * | 1/2017 | Ording | G06F 3/0484 | |
| 9,575,488 B2 * | 2/2017 | Timsjo | G02B 27/0093 | |
| 9,625,887 B2 * | 4/2017 | Ilic | G05B 15/02 | |
| 9,733,954 B2 * | 8/2017 | Schechter | G06F 3/04817 | |
| 9,977,413 B2 * | 5/2018 | Laycock | G05B 19/042 | |
| 10,014,684 B2 * | 7/2018 | Kashiwagi | H02J 3/00 | |
| 10,031,660 B2 * | 7/2018 | Bachman | G06F 3/0486 | |
| 2001/0025146 A1 * | 9/2001 | Maloney | A61B 5/04888 | 600/546 |
| 2007/0128899 A1 * | 6/2007 | Mayer | G06F 9/4406 | 439/152 |
| 2007/0208520 A1 * | 9/2007 | Zhang | H02H 1/0015 | 702/58 |
| 2008/0024140 A1 * | 1/2008 | Henson | H02H 1/0015 | 324/536 |
| 2008/0177994 A1 * | 7/2008 | Mayer | G06F 9/4418 | 713/2 |
| 2009/0030556 A1 * | 1/2009 | Castelli | G06Q 10/063 | 700/286 |
| 2010/0088627 A1 * | 4/2010 | Enkerud | G06F 3/0484 | 715/777 |
| 2010/0327687 A1 * | 12/2010 | Iannello | F16O 32/0442 | 310/90.5 |
| 2012/0226786 A1 * | 9/2012 | Nekkar | G05B 19/0426 | 709/220 |
| 2013/0113700 A1 * | 5/2013 | Nagai | G09G 5/00 | 345/156 |
| 2013/0147849 A1 * | 6/2013 | Kwak | G09G 5/14 | 345/666 |
| 2013/0317944 A1 * | 11/2013 | Huang | G01S 5/0252 | 705/26.61 |
| 2015/0248220 A1 * | 9/2015 | Gottschlag | G06F 3/0488 | 715/716 |
| 2018/0150198 A1 * | 5/2018 | Lee | G06F 3/0482 | |

FOREIGN PATENT DOCUMENTS

| | | |
|---|---|---|
| JP | 2008017529 A | 1/2008 |
| JP | 4908219 B2 | 4/2012 |
| JP | 2013081039 A | 5/2013 |
| JP | 10-1595024 B1 | 2/2016 |
| KR | 20140128750 A | 11/2014 |
| WO | 2014058889 A1 | 4/2014 |

OTHER PUBLICATIONS

Korean Office Action for related Korean Application No. 10-2016-0161155; action dated Mar. 21, 2018; (5 pages).

* cited by examiner

METHOD FOR DISPLAYING MONITORING SCREEN AT A DISPLAY LOCATION

CROSS-REFERENCE TO RELATED APPLICATIONS

This application claims the benefit of Korean Patent Application No. 10-2016-0161155, filed on Nov. 30, 2016, entitled "METHOD FOR DISPLAYING A MONITORING SCREEN", which is hereby incorporated by reference in its entirety into this application.

BACKGROUND

1. Technical Field

The present disclosure relates to a method for displaying a monitoring screen, and more specifically to a method for displaying a monitoring screen by which a file of a monitoring screen is moved to a position by drag-and-drop to display the monitoring screen at the position.

2. Description of the Related Art

A supervisory control and data acquisition (SCADA) system is a large-scale system that processes and monitors a large volume of data and provides a variety of functions associated therewith. In particular, such a SCADA system is frequently employed for controlling a large-scale process, and a control program is used to intuitively monitor and manage data associated with the process.

Such a control program is typically connected to the software and database of the SCADA system and provides analysis functions using various data generated from the process. To this end, the control program displays the data associated with the process on the monitoring screen in the form of human-recognizable objects, and the user can analyze and manage the process using the objects.

As the industry grows and the complexity of the process increases, the monitoring screen used in the control program are refined more and more. Accordingly, a method for displaying a number of monitoring screens conveniently and efficiently is required.

According to an existing method for displaying a monitoring screen, one or more viewports are executed to be arranged on a monitor screen, and a monitoring screen to be displayed is searched for at each of the viewports. Then, the monitoring screen is displayed on each of the viewports.

More specifically, according to the existing method, a user executes a control program and then executes viewports. Subsequently, the user opens a search window in each of the viewports to search files of the monitoring screen. Subsequently, the user executes the found file and displays a monitoring screen corresponding to the file in the viewport. Finally, the user locates the viewport displaying the monitoring screen at an arbitrary position on the monitor.

According to the above-described existing method, when a number of viewports are used, files of the monitoring screens have to be searched for and executed for each of the viewports, and each of the executed monitoring screens has to be moved. This requires many user operations.

Further, according to the existing method, there is a problem in that the user's operation is difficult since the user use the mouse only to click not to drag-and-drop for executing the files of the monitoring screen.

In addition, according to the existing method, it requires executing the viewport first to execute the monitoring files, and thus the efficiency of displaying the monitoring screen is low.

Further, according to the existing method, as only the monitoring screen designated by the user is displayed on the initial screen when the control program is executed, there is a problem in that the user cannot figure out his control pattern to reflect it.

SUMMARY

It is an object of the present disclosure to provide a method for displaying a monitoring screen in which a user input of a file of a monitoring screen to be displayed along with the location at which the monitoring screen is to be displayed is entered, to thereby reduce the user's operation.

It is another object of the present disclosure to provide a method for displaying a monitoring screen in which the file of the monitoring screen is moved to the display location by drag-and-drop, to thereby simplify the user's operation.

It is another object of the present disclosure to provide a method for displaying a monitoring screen in which if no viewport is displayed at a display location, a viewport is displayed at the display location and then the monitoring screen is displayed on the viewport, thereby improving the efficiency of use of the control program.

It is an object of the present disclosure to provide a method for displaying a monitoring screen in which the most recently displayed monitoring screen or the most frequently displayed monitoring screen is displayed when the control program is executed, such that it is possible to reflect the user's control pattern.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a method for displaying a monitoring screen for a control program includes: providing a list of files of monitoring screens via a display unit; receiving a file of a monitoring screen to be displayed among the files of the list and a display location of the monitoring screen from a user; and executing the file of the monitoring screen input from the user to display the monitoring screen at the display location.

According to an exemplary embodiment of the present disclosure, a user enters the file of the monitoring screen to be displayed along with the location at which the monitoring screen is to be displayed, to thereby reduce the user's operation.

Further, according to an exemplary embodiment of the present disclosure, the file of the monitoring screen is moved to the display location by drag-and-drop, to thereby simplify the user's operation.

In addition, according to an exemplary embodiment of the present disclosure, if no viewport is displayed at a display location, a viewport is displayed at the display location and then the monitoring screen is displayed on the viewport, thereby improving the efficiency of use of the control program.

Further, according to an exemplary embodiment of the present disclosure, the most recently displayed monitoring screen or the most frequently displayed monitoring screen is displayed when the control program is executed, such that it is possible to reflect the user's control pattern.

DETAILED DESCRIPTION

Figure 1:
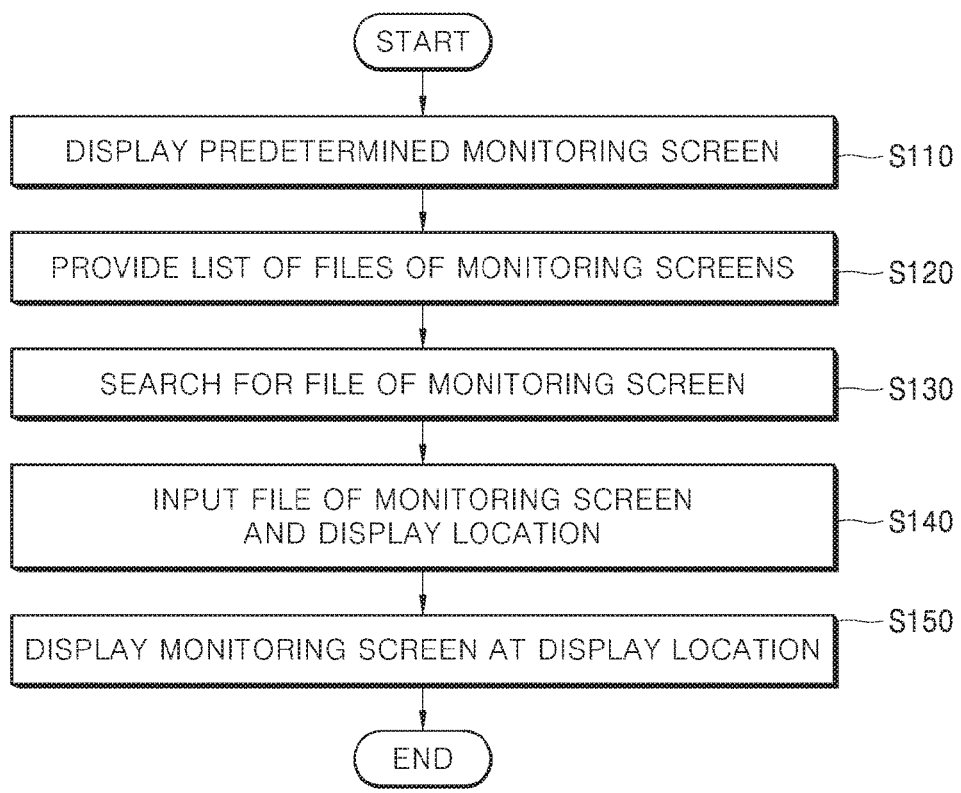
FIG. 1 is a flowchart illustrating a method for displaying a monitoring screen according to an exemplary embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to the like elements.

FIG. 1 is a flowchart illustrating a method for displaying a monitoring screen according to an exemplary embodiment of the present disclosure. Referring to FIG. 1, the method for displaying a monitoring screen according to an exemplary embodiment of the present disclosure includes displaying a predetermined screen via a display unit upon a user's request (step S110); providing a list of files of a monitoring screen via the display unit (step S120); searching one or more files included in the list for a file of the monitoring screen to be displayed (step S130); receiving the file of the monitoring screen along with a display location at which the monitoring screen is to be displayed from the user (step S140); and executing the file of the monitoring screen input from the user to display the monitoring screen at the display location (step S150).

The method shown in FIG. 1 is merely an example, and the above-described sequence and elements thereof are not limited to those shown in FIG. 1. Some elements may be added, modified or eliminated as desired. Hereinafter, steps S110 to S150 will be described in detail with reference to the drawings.

The method for displaying a monitoring screen according to an exemplary embodiment of the present disclosure may be performed by a processor running a control program. More specifically, the method for displaying a monitoring screen may be performed as a processor executes a certain process included in a control program.

In the method for displaying the monitoring screen of the control program, a list of files of the monitoring screen can be provided via the display unit (step S120). The display unit includes all kinds of screen display devices for visually displaying data, for example, a monitor of a computer.

The control program may be a program linked to the software used in the control system. For example, in a supervisory control and data acquisition (SCADA) system used to control a large-scale process, the control program may be an HMI (Human Machine Interface) for intuitively monitoring and managing data related to the process. Such HMI is connected to the software and database of the SCADA system and provides analysis functions using various data generated from the process.

The monitoring screen may include a screen showing various data used for the control program in the form of objects that can be recognized by human. The user can analyze and manage the process using the objects displayed on the monitoring screen.

Figure 2:
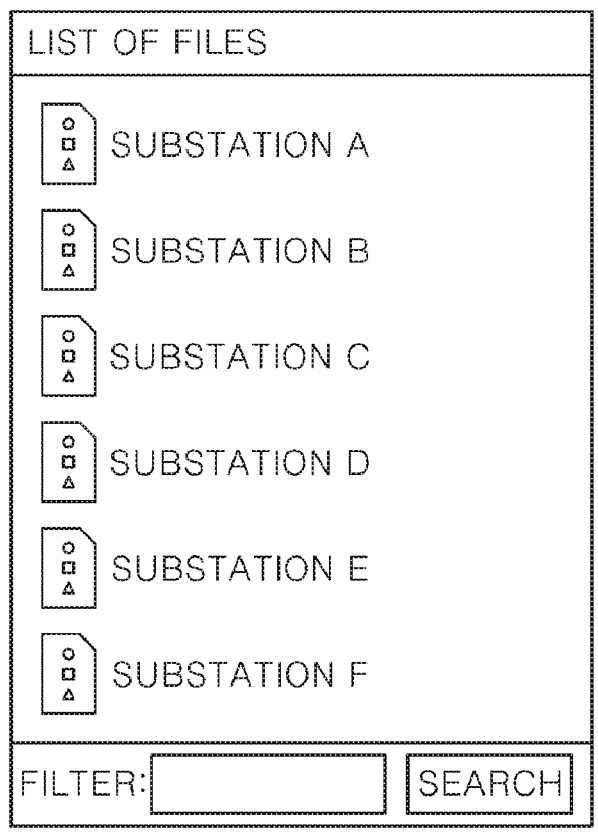
FIG. 2 is a diagram showing a list of files on a monitoring screen according to an exemplary embodiment of the present disclosure.

FIG. 2 is a diagram showing a list of files on a monitoring screen according to an exemplary embodiment of the present disclosure. Referring to FIG. 2, the monitoring screen may indicate data associated with the process in each of substations installed across different areas. The files of the monitoring screen may refer to files where each monitoring screen is stored with its substation. In the list of files, files of the monitoring screen each corresponding to the process of the respective substations may be listed.

According to an exemplary embodiment of the present disclosure, one or more files included in the list may be searched for a file of the monitoring screen to be displayed (S130). Referring back to FIG. 2, a search window may be further displayed below the list. According to an exemplary embodiment of the present disclosure, a user may enter a keyword to search for a file of the monitoring screen containing the keyword.

For example, according to an exemplary embodiment of the present disclosure, when a user enters a keyword "Substation D" into the search window and clicks a search button, the one or more files may be searched for the file of the monitoring screen containing the keyword "Substation D" to display it.

According to an exemplary embodiment of the present disclosure, a user may enter the file of the monitoring screen to be displayed along with the location where the monitoring screen is to be displayed (S140). More specifically, the user may enter the file of the monitoring screen to be displayed and the location by drag-and-drop.

The display location may be any position included in the screen displayed via one or more monitoring devices. The display location refers to a position at which the user wants to display the monitoring screen. If the monitoring device is a monitor of a computer, the display location may be an arbitrary position included in the screen displayed through the monitor. When multiple monitors are used, the display location may be an any position included in the screen displayed via an arbitrary monitor.

The drag-and-drop refers to a pointing device gesture in computer graphic user interface environment, in which a user selects a visual object to move (drag) it to another position and then releases (drops) it. For example, when a mouse is used as the input device, a user moves (drags) a file with the mouse clicked and release the click (drops the file) at another position.

The user may click the mouse on the file of the monitoring screen, and then drag the file to a desired position to release the mouse. As soon as the click is released, the file of the monitoring screen and the display location at which the monitoring screen is to be displayed can be simultaneously input.

Figure 3:
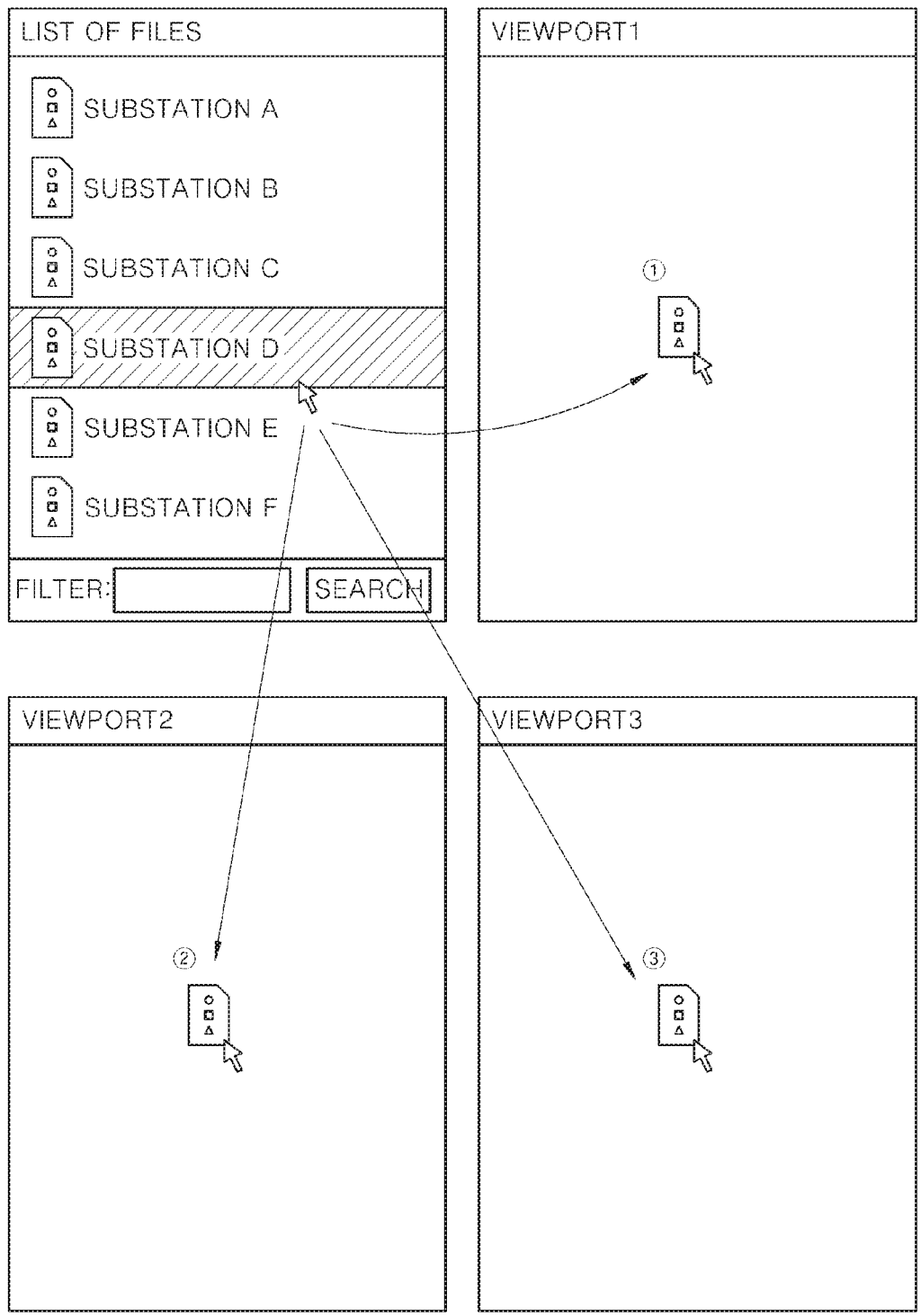
FIG. 3 is a diagram showing an operation of moving a file of the monitoring screen to viewports by drag-and-drop.
Figure 4:
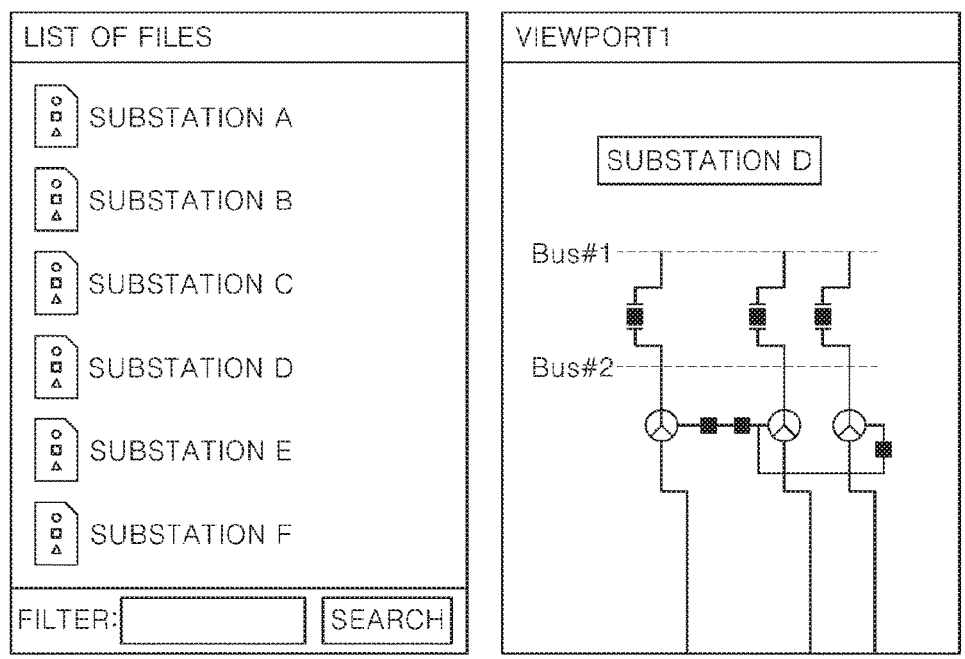
FIG. 4 is a diagram showing a file of the monitoring screen is executed such that the monitoring screen is displayed in a viewport.
Figure 4:
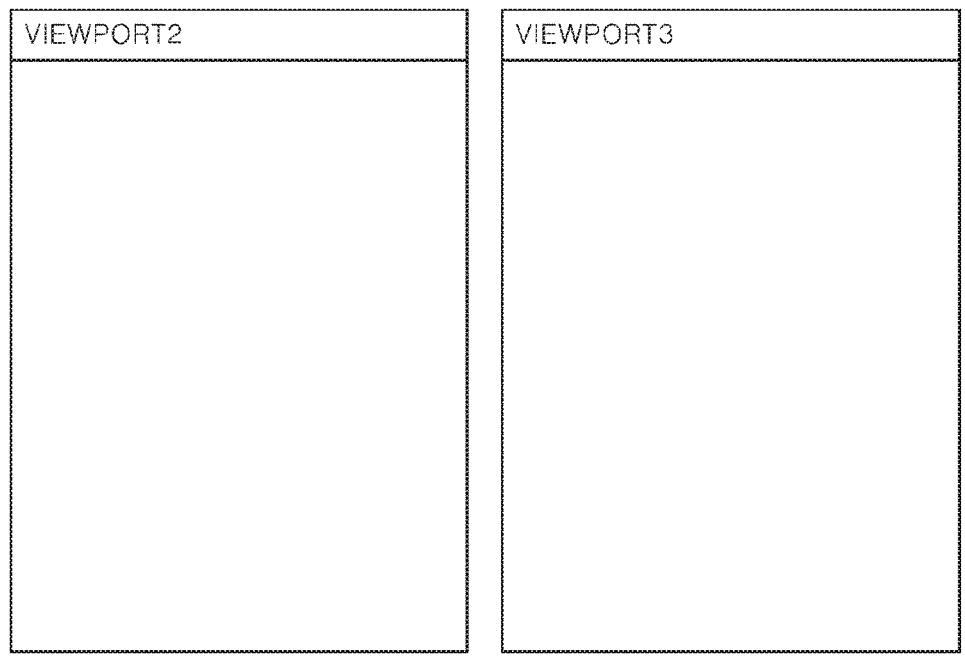

FIG. 3 is a diagram showing an operation of moving a file of the monitoring screen to viewports by drag-and-drop. FIG. 4 is a diagram showing a file of the monitoring screen is executed such that the monitoring screen is displayed in a viewport.

Referring to FIG. 3, the list of files and the viewports 1 to 3 may be displayed via the display unit. The viewports refer to regions set to display graphic screens in the display device. The monitoring screens may be displayed on the viewports. To this end, the viewports may be associated with the control program using the method according to the exemplary embodiments of the present disclosure. It is to be noted that the configuration and size of the viewports are not particularly limited herein. For example, a plurality of viewports may be displayed on one monitor.

Referring back to FIG. 3, the display unit may display the viewports 1 to 3 in addition to the list. Some of the viewports 1 to 3 may be blank screens in which no monitoring screen is displayed. The user may click the mouse on the file of the monitoring screen for Substation D found in FIG. 2. Then, the user may move (drag) the file to an arbitrary display location (①, ② or ③) with the mouse clicked and release (drop) it. As soon as the user releases the mouse, the file of the monitoring screen for Substation D and the display location of the monitoring screen may be simultaneously input.

As described above, according to an exemplary embodiment of the present disclosure, a user enters the file of the monitoring screen to be displayed along with the location at which the monitoring screen is to be displayed, to thereby reduce the user's operation. Further, according to an exemplary embodiment of the present disclosure, the file of the monitoring screen is moved to the display location by drag-and-drop, to thereby simplify the user's operation.

According to an exemplary embodiment of the present disclosure, the file of the monitoring screen input from a user is executed, such that the monitoring screen to be displayed may be displayed at the display location (S150). More specifically, according to an exemplary embodiment of the present disclosure, if a viewport is already displayed at the display location, the monitoring screen to be displayed may be displayed on the viewport.

Referring again to FIG. 3, the viewports 1 to 3 may be displayed at display locations (①, ② or ③) where the user moved the file of the monitoring screen for Substation D. The user may move the file of the monitoring screen for the Substation D to one of the viewports 1 to 3. For example, the user may move the file of the monitoring screen for the Substation D to the viewport 1.

Referring to FIG. 4, when the user moves the file of the monitoring screen for Substation D to the viewport 1 by the drag-and-drop, the file of the monitoring screen for Substation D may be executed on the viewport 1. Accordingly, the monitoring screen for the Substation D may be displayed on the viewport 1. Although not shown in the drawing, the monitoring screen may be displayed in the viewport 2 and the viewport 3 in the same manner.

As described above, according to an exemplary embodiment of the present disclosure, the file of the monitoring screen entered from the user is executed, such that the monitoring screen to be displayed may be displayed at a display location.

Alternatively, according to another exemplary embodiment of the present disclosure, if no viewport is displayed yet at the display location, a viewport is displayed at the display location and the monitoring screen may be displayed on the viewport.

Figure 5:
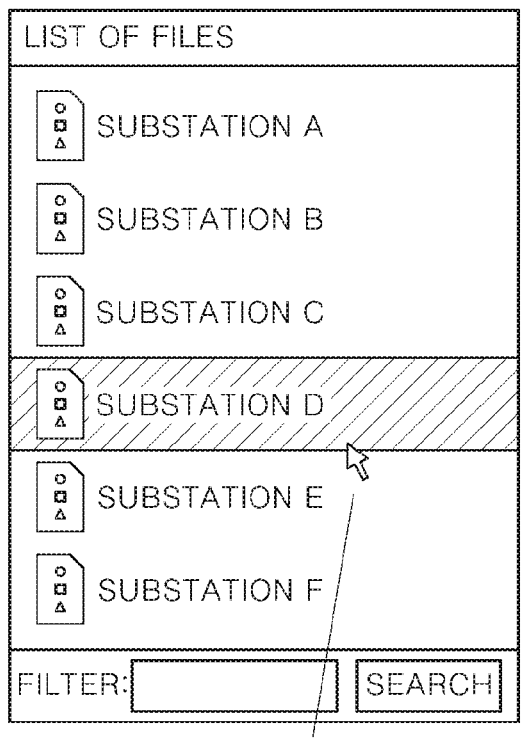
FIG. 5 is a diagram showing an operation of moving the file of the monitoring screen to a display location by drag-and-drop.
Figure 5:
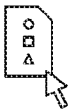
Figure 6:
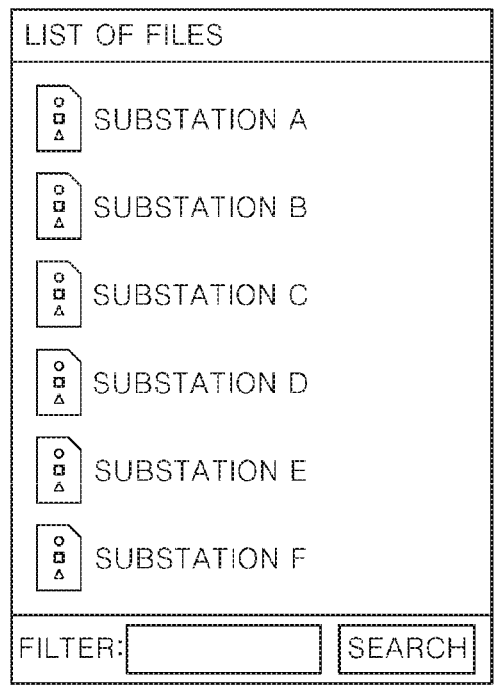
FIG. 6 is a diagram showing a viewport displayed at a display location and a monitoring screen displayed on the viewport.
Figure 6:
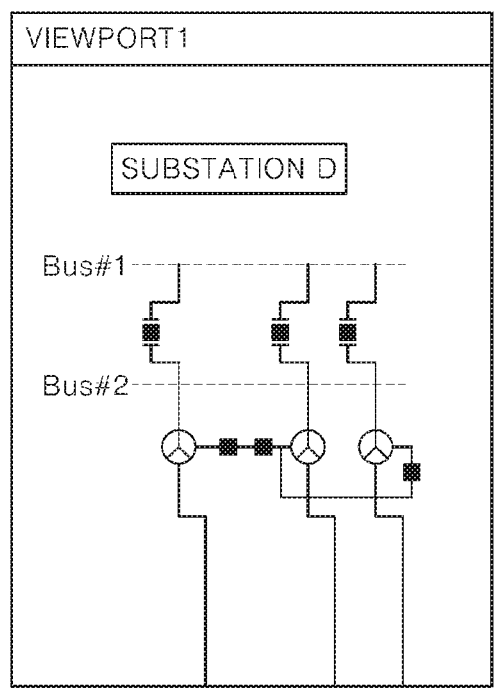

FIG. 5 is a diagram showing an operation of moving the file of the monitoring screen to a display location by drag-and-drop. FIG. 6 is a diagram showing a viewport displayed at a display location and a monitoring screen displayed on the viewport.

Referring to FIG. 5, a user may click the mouse on the file of the monitoring screen for Substation D found in FIG. 2. Then, the user may move (drag) the file to an arbitrary display location (①, ② or ③) with the mouse clicked and release (drop) it. No viewport may be displayed at the display location (①') to which the file of the monitoring screen has been moved.

Referring to FIG. 6, if no viewport is displayed yet at the display location (①') where the file of the monitoring screen for Substation D has been moved, the viewport 1 may be executed such that it is displayed at the display location (①'). Then, the file of the monitoring screen for the Substation D may be executed on the viewport 1, so that the monitoring screen for the Substation D may be displayed on the viewport 1.

As described above, according to an exemplary embodiment of the present disclosure, if no viewport is displayed at a display location, a viewport is displayed at the display location and then the monitoring screen is displayed on the viewport, thereby improving the efficiency of use of the control program.

According to an exemplary embodiment of the present disclosure, the user may interrupt the display of the monitoring screen displayed on the viewport at a display location to display a monitoring screen to be displayed. More specifically, when a viewport is displayed at a display location and a monitoring screen is already displayed on the viewport, the monitoring screen may be replaced with another monitoring screen to be displayed.

Figure 7:
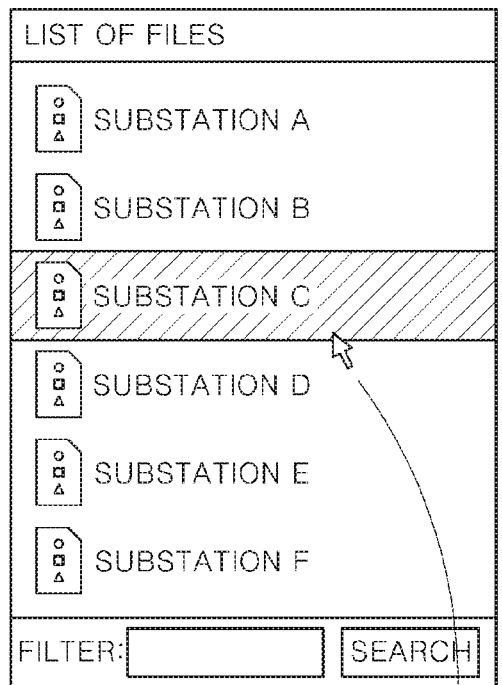
FIG. 7 is a diagram showing an operation of moving a file of the monitoring screen by drag-and-drop to a viewport in which another monitoring screen is displayed.
Figure 7:
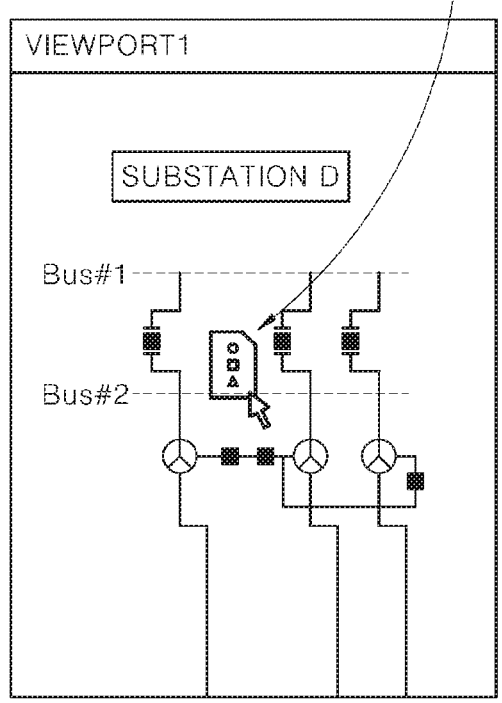
Figure 8:
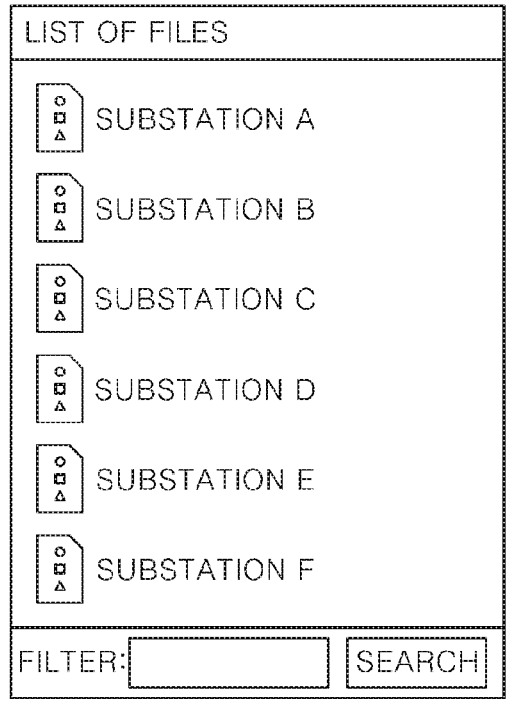
FIG. 8 is a diagram showing the viewport on which the monitoring screen of FIG. 7 has been replaced with another monitoring screen.
Figure 8:
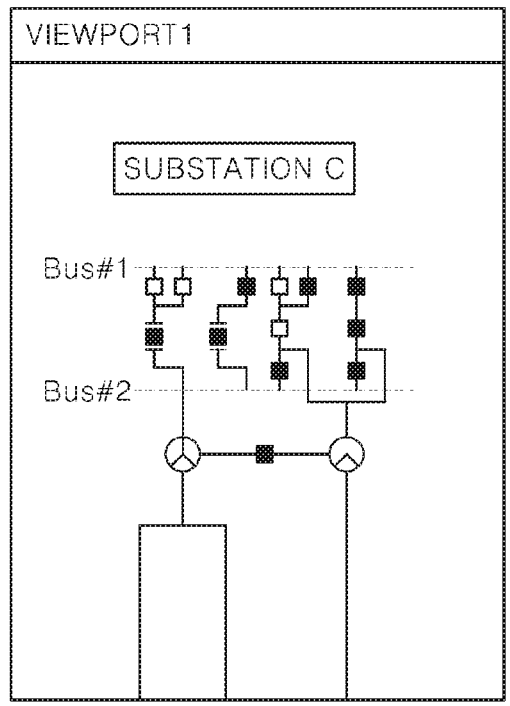

FIG. 7 is a diagram showing an operation of moving a file of the monitoring screen by drag-and-drop to a viewport in which another monitoring screen is displayed. FIG. 8 is a diagram showing the viewport on which the monitoring screen of FIG. 7 has been replaced with another monitoring screen.

Referring to FIG. 7, a user may click the mouse on the file of the monitoring screen for Substation C. Then, the user may move (drag) the file to the viewport 1 where the monitoring screen for Substation D is already displayed with the mouse clicked, and release (drop) it.

Referring to FIG. 8, if the monitoring screen for Substation D is displayed at the display location where the monitoring screen for Substation C of FIG. 7 has been moved, the display of the monitoring screen for Substation D may be interrupted. Then, the file of the monitoring screen for Substation C may be executed, such that it is displayed on the viewport 1.

In other words, if a user wants to display a monitoring screen on a viewport where another monitoring screen is being displayed, the user can move the file of the monitoring screen he wants to display to the viewport by drag-and-drop. The monitoring screen that is already being displayed may be replaced with the monitoring screen that the user wants to display.

According to an exemplary embodiment of the present disclosure, it is possible to determine whether or not a monitoring screen can be displayed at a display location input from a user. More specifically, according to an exemplary embodiment of the present disclosure, it is possible to determine whether a viewport is displayed at a display location. If the viewport is displayed, the monitoring screen is displayed in the viewport. If the viewport is not displayed, the viewport is executed, and the monitoring screen can be displayed in the executed viewport, as described above.

In addition, according to an exemplary embodiment of the present disclosure, it is possible to determine whether another program is being executed at a display location. For example, if another program is running and displayed at the display location even though no viewport is being displayed there, the monitoring screen may not be displayed at the display location. Accordingly, according to an exemplary embodiment of the present disclosure, it is possible to determine whether the monitoring screen can be displayed at the display location by determining whether the input display location is included in the screen of another program that is already running.

According to an exemplary embodiment of the present disclosure, if another program is running at the display location, a notification message indicating that the monitoring screen cannot be displayed may be provided to the user. More specifically, a notification message can be visually displayed on the screen of on a monitor.

According to an exemplary embodiment of the present disclosure, a predetermined monitoring screen may be displayed by the display unit upon a user's request. More specifically, when the user executes the control program, a predetermined monitoring screen may be displayed for configuring the initial screen. In addition, according to an exemplary embodiment of the present disclosure, a user may further determine whether to display a predetermined monitoring screen. For example, according to an exemplary embodiment of the present disclosure, a predetermined monitoring screen may be displayed when the control program is started, and the user may enter an instruction whether to hold it via a separate input window.

The predetermined monitoring screen may be the most recently displayed monitoring screen. More specifically, according to an exemplary embodiment of the present disclosure, the configurations of the monitoring screen and the viewport displayed on the screen when the most recently executed control program is ended may be stored. When the user executes the control program again later on, the stored layout of the monitoring screen and viewport may be configured as the initial screen.

In addition, the predetermined monitoring screen may be a monitoring screen that is most frequently displayed. More specifically, according to an exemplary embodiment of the present disclosure, the number of times that each of the files of the monitoring screens is executed in the control program may be counted whenever the user executes the control program. When the user executes the control program again later on, the file of the monitoring screen that has been executed the largest number of times is executed, such that the monitoring screen may be configured as the initial screen. In addition, the predetermined monitoring screen may be configured by arranging the monitoring screens and the viewports by the user as desired.

As described above, according to an exemplary embodiment of the present disclosure, the most recently displayed monitoring screen or the most frequently displayed monitoring screen is displayed when the control program is executed, such that it is possible to reflect the user's control pattern.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A method for displaying a monitoring screen, the method comprising:
   providing a list of files of monitoring screens via a display unit;
   receiving a file of a monitoring screen to be displayed among the files of the list and a display location of the monitoring screen from a user;
   executing the file of the monitoring screen input from the user to display the monitoring screen at the display location;
   displaying a viewport at the display location if no viewport is displayed at the display location and displaying the monitoring screen on the viewport; and
   determining whether the monitoring screen is able to be displayed at the display location input from the user, and providing a notification message to the user if another program is running at the display location, the notification message indicating that the monitoring screen cannot be displayed,
   wherein the receiving comprises receiving the file of the monitoring screen to be displayed and the display location of the monitoring screen by drag-and-drop.

2. The method of claim 1, further comprising:
   displaying the monitoring screen on the viewport if a viewport is displayed at the display location.

3. The method of claim 1, further comprising:
   displaying a predetermined monitoring screen via the display unit upon the user's request, prior to the providing.

4. The method of claim 3, wherein the predetermined monitoring screen is a most recently displayed monitoring screen or a most frequently displayed monitoring screen.

5. The method of claim 1, wherein the executing comprises interrupting displaying a monitoring screen on the viewport displayed at the display location to display the monitoring screen to be displayed.

6. The method of claim 1, further comprising:
   searching the files of the list for the file of the monitoring screen to be displayed.

7. The method of claim 1, wherein the display location is an arbitrary position included in a screen displayed via one or more monitoring devices.

* * * * *